United States Patent
Brown et al.

[15] 3,657,550
[45] Apr. 18, 1972

[54] APPARATUS FOR MEASURING THE SPATIAL RESPONSE OF OPTICAL SYSTEMS

[72] Inventors: Earl Franklin Brown, Piscataway; William Kaminski, Hunterdon, both of N.J.

[73] Assignee: Bell Telephone Laboratories, Incorporated, Murray Hill, Berkeley Heights, N.J.

[22] Filed: Apr. 7, 1970

[21] Appl. No.: 26,292

[52] U.S. Cl. ............... 250/217 CR, 324/20 CR, 178/DIG. 4
[51] Int. Cl. .......................................................... G01r 31/22
[58] Field of Search .............. 250/217 CR; 356/124; 324/20, 324/20 CR; 178/DIG. 4, 5.4 TE

[56] References Cited

UNITED STATES PATENTS

| | | | |
|---|---|---|---|
| 2,731,597 | 1/1956 | Schade | 324/20 |
| 3,193,690 | 7/1965 | Murata et al. | 356/124 |
| 2,771,004 | 11/1956 | Sachtleben | 356/124 |
| 3,028,544 | 4/1962 | Stone | 324/20 |

Primary Examiner—Walter Stolwein
Attorney—R. J. Guenther and E. W. Adams, Jr.

[57] ABSTRACT

To measure the spatial response characteristics of optical systems, control circuitry is provided to electrically generate a predetermined one-dimensional spatial waveform (e.g., sinusoidal) on the display screen of a cathode ray tube. The optical system to be tested (e.g., a television system) is placed between the spatial waveform display and a suitable detector which comprises a mask having a narrow slit followed by a photomultiplier. The output of the latter is then displayed on an oscilloscope, or measured in some other known fashion. A linear light modulation is achieved for the spatial waveform display by gating a linearly scanned electron beam with constant amplitude, constant duration, variable duty cycle pulses. Appropriate waveforms can be selected to evaluate the spatial frequency response, transient response, linearity, or steady state response of the optical system under test.

20 Claims, 9 Drawing Figures

INVENTORS E. F. BROWN
W. KAMINSK

APPARATUS FOR MEASURING THE SPATIAL RESPONSE OF OPTICAL SYSTEMS

BACKGROUND OF THE INVENTION

This invention relates to apparatus used for making objective measurements of the spatial response characteristics of optical systems. In a particularly advantageous embodiment of the invention, the spatial frequency response of photographic, optical or television systems is readily measured using such apparatus.

A variety of schemes have been proposed and used for making objective measurements of the spatial response characteristics of photographic, optical and television systems; for example, see the bibliography appended to the article "A Method for Measuring the Spatial-Frequency Response of a Television System" by E. F. Brown, *Journal of the S.M.P.T.E.*, Vol. 76, No. 9, Sept. 1967, pp. 884–888. These techniques usually employ a target or aperture (e.g., a photographic transparency) which is placed ahead or in front of the system to be measured. The system response to the target or aperture is then recorded on an oscilloscope, photographic film or similar recording device. Usually some sort of scanning arrangement is employed such that incremental measurements may be made across the target or aperture surface. For example, the photographic transparency is often moved with respect to the light detector disposed behind the optical system under test; see "Physical Optics in Photography" by G. Franke, The Focal Press (1966), pp. 179–185.

The need for a flexible spatial waveform generator to objectively measure the spatial response (e.g., spatial frequency response) of equipment and components in the optic, photographic and television fields has existed for many years (see the aforementioned bibliography). Spatial waveforms are typically obtained by electro-mechanical techniques or by photographic gratings. Square wave, photographic transparency, gratings of varying periodicity have proven to be quite popular. This is so because of the difficulty of fabricating other more desirable spatial gratings — such as sinusoidal gratings. As pointed out in the book by Franke, noted above, attempts to make sine wave gratings by photographic methods have proven inaccurate. As further noted in Franke, pp. 182–183, moire fringe methods have been proposed for this purpose, as have arrangements for varying the slit length of the mask of the light detector means, for disposing the typical square wave grating on a conical surface, etc. Franke, quite apparently, and others have experienced difficulties with each of these and the other electro-mechanical and photographic techniques proposed heretofore. The use of a sinusoidal grating to determine the frequency response of an optical system is particularly advantageous since the same is direct, i.e., the time to frequency transformation typically required by square wave gratings is not necessary.

Accordingly, it is a primary object of the present invention to facilitate the objective measurement of the spatial response characteristics of optical systems.

A related object is to generate luminous spatial waveforms having electrically controlled periodicity, waveshape and modulation depth.

A more specific object of the invention is to display a sinusoidal spatial waveform of variable periodicity and constant peak luminance on a cathode ray tube.

SUMMARY OF THE INVENTION

In accordance with the present invention control circuitry is provided to electrically generate a predetermined one-dimensional spatial waveform (e.g., sinusoidal) on the display screen of a cathode ray tube. The optical system to be measured (e.g., a television system) is placed between the spatial waveform display and a suitable detector which may comprise a mask having a narrow slit followed by a photomultiplier. The output of the photomultiplier can then be displayed on a cathode ray oscilloscope, or measured in some other known fashion. One-dimensional spatial waveforms having electrically controlled periodicity, waveshape and modulation depth can be displayed on the cathode ray tube. Linear light modulation is achieved by means of a "half-tone process." The half-tone process is achieved by gating a linearly scanned electron beam with constant amplitude, constant duration, variable duty cycle pulses. In this manner, a light source is obtained whose intensity is linearly related to modulating signal. Appropriate waveforms can be rapidly selected to evaluate the spatial frequency response, transient response, linearity, or steady state response of the optical system under test.

It is a feature of the invention to provide a one-dimensional sinusoidal spatial waveform of variable periodicity, which is linearly related in luminosity to an analog control signal.

BRIEF DESCRIPTION OF THE DRAWINGS

The invention will be more fully appreciated from the following detailed description when considered in connection with the accompanying drawings in which.

DETAILED DESCRIPTION

Figure 1:
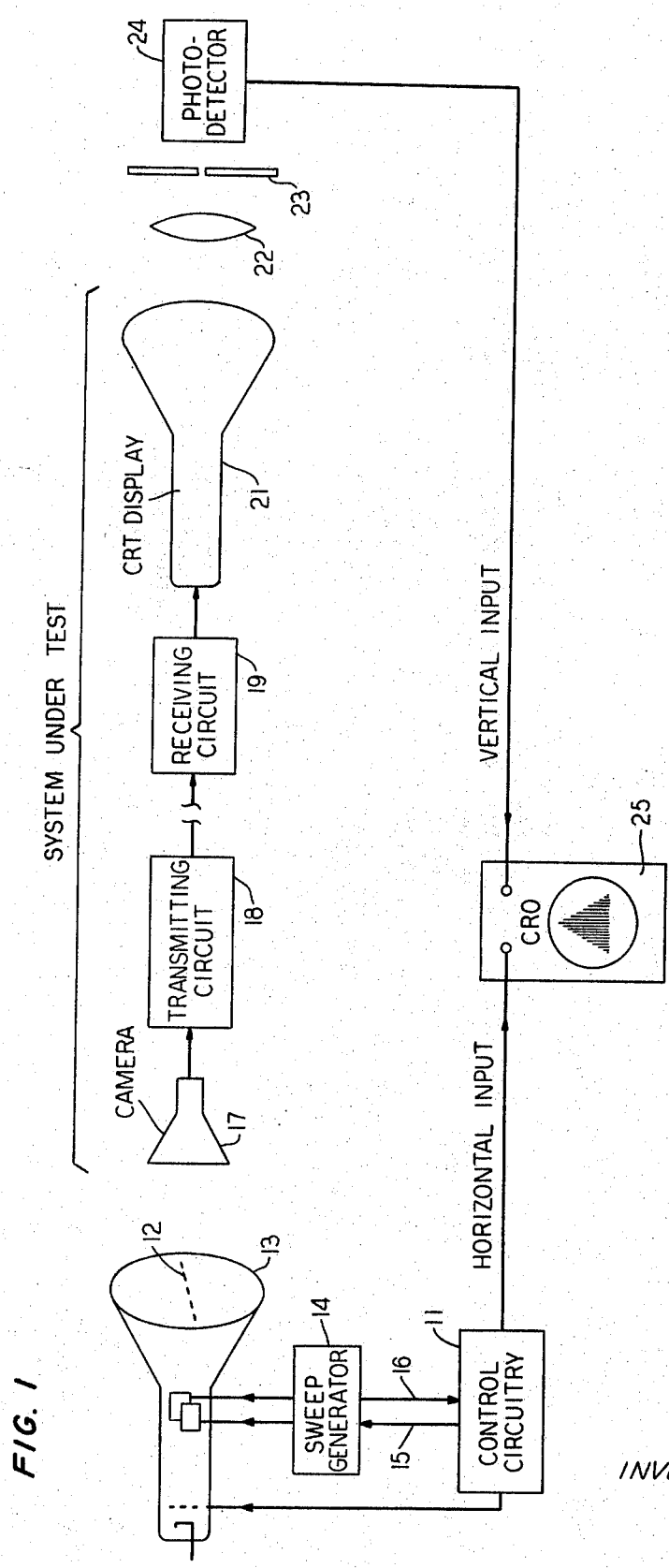
FIG. 1 shows a schematic block diagram of apparatus used for making measurements of the spatial response characteristics of a television system in accordance with the present invention.

Turning now to FIG. 1 of the drawings, control circuitry 11 is provided to electrically generate a predetermined one-dimensional spatial waveform 12 on the display screen of the cathode ray tube (CRT) 13. As will be explained in detail hereinafter, the desired waveform is achieved by the application of constant amplitude, constant duration, variable duty cycle pulses to the control grid of cathode ray tube 13. The sweep generator 14 supplies a typical ramp or sawtooth signal to the horizontal deflection plates of the CRT to provide a linear scan for the electron beam. As will be later discussed, the sweep generator 14 may be synchronized to a sync signal delivered from control circuitry 11 over lead 15 or, alternatively, the same may be essentially free-running. In the latter case, the generator 14 delivers a phase comparison signal over lead 16 to the control circuitry 11 for a purpose to be described.

As shown in FIG. 1, the television system under test is placed between the spatial waveform display and a suitable detector. The spatial waveform 12 observed by the television camera 17 is delivered by the transmitting circuit 18, along with the necessary television synchronization signals, to the receiving circuit 19 so as to display on tube 21 a replica of waveform 12. The lens 22 serves to focus the image obtained from the spatial waveform replica upon the aperture of mask 23. The lens 22 typically provides some image magnification e.g., 5×). The aperture in mask 23 may comprise a pin-hole, but more often it is a narrow slit (e.g., 0.25 mm in width). The image magnification (5×) provided by lens 22 serves to reduce the effective slit width by one-fifth. The photo-detector 24 is disposed behind the mask 23 and it can comprise a conventional photomultiplier. The output of the photo-detector 24 is delivered to the vertical input terminal of the cathode ray oscilloscope 25. A horizontal input signal is also delivered to the oscilloscope 25 for the purpose of obtaining a stationary display; the latter signal may be derived from the control circuitry 11 in the manner to be described hereinafter.

The overall test set-up corresponds to that described in the aforementioned Brown article, the significant departure being in the target, i.e., the means for generating the luminous display. In the Brown article the target comprises a photographic transparent, the attendant shortcomings of which have been noted above. As will be apparent to those in the art, the use of an oscilloscope is not essential for making measurements of the spatial response characteristics of optical systems, and the photo-detector output can be objectively measured in accordance with any of the other measurement techniques known in the art.

Figure 2:
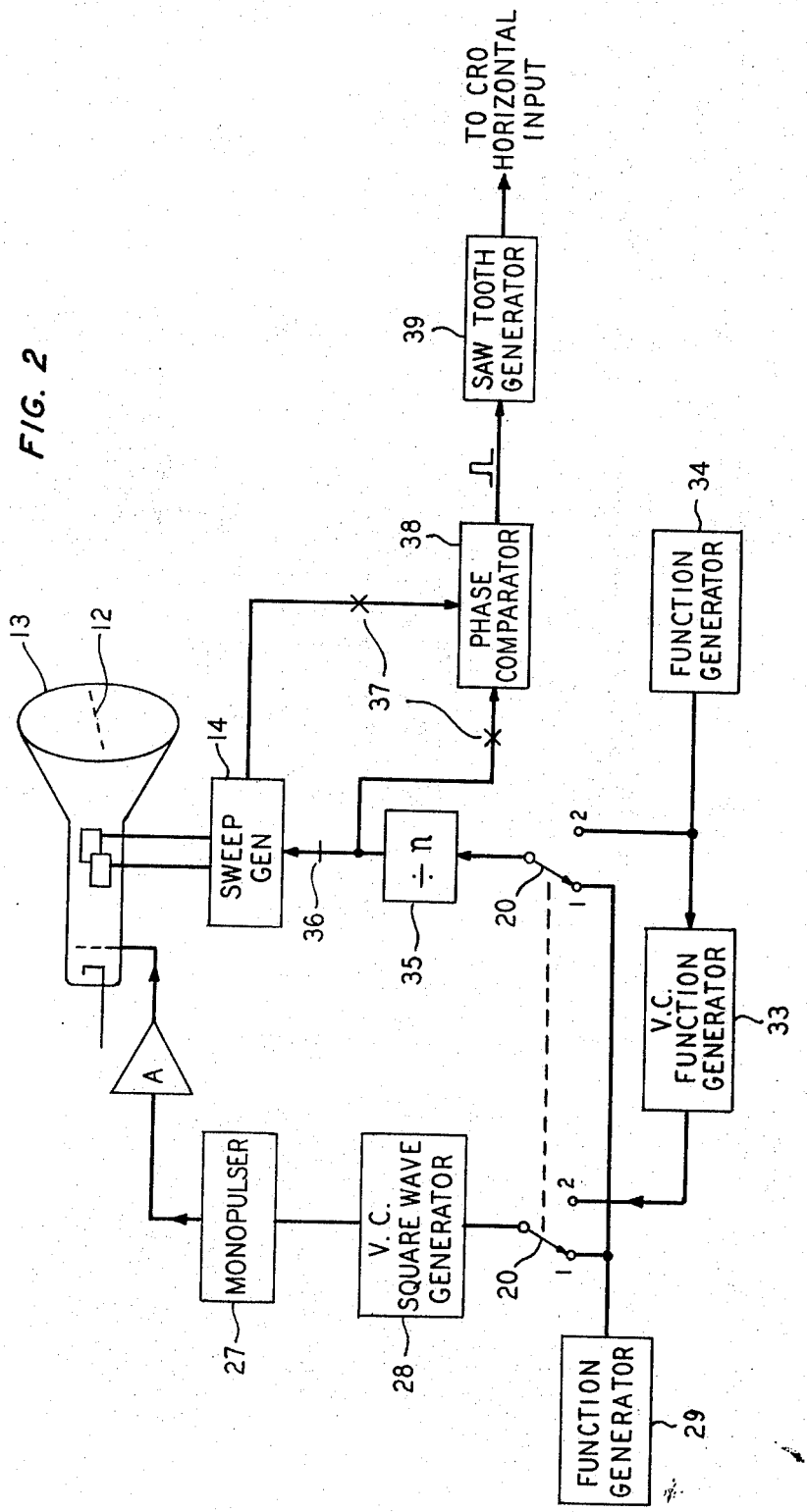
FIG. 2 is a schematic block diagram of a spatial waveform generator constructed in accordance with the invention.

FIG. 2 shows a spatial waveform generator, in accordance with the invention, for producing one-dimensional spatial waveforms of electrically controlled periodicity, waveshape and modulation depth. Linear light modulation is achieved by means of a half-tone process. This half-tone process is obtained by gating the linearly scanned electron beam of cathode ray tube 13 with constant amplitude, constant duration, variable duty cycle pulses. The electrical generation of spatial waveforms can, of course, also be implemented by intensity or velocity modulation of the electron beam of the CRT. Unfortunately, however, the trace luminosity is not linearly related to the analog electrical control signal for intensity or velocity modulation. Either of the latter modulation techniques would require that non-linear corrective networks be used to arrive at a luminous source whose intensity relates linearly to the amplitude of the electrical control signal. Although such a source can perhaps be implemented, it would be vulnerable to relative changes of the CRT transfer characteristics vis-a-vis the corrective network.

A proportional control arrangement has been devised, in accordance with the invention, by employing fixed pulse length and amplitude and varying the duty cycle thereof to obtain a corresponding average output light value. The space averaged light intensity is proportional to the modulating frequency:

$$I_{out} \alpha I_{um} \cdot \frac{t_p}{T_i} = I_{um} \cdot t_p \cdot f_i$$

where $I_{um}$ = unmodulated light intensity
$t_p/T_i$ = instantaneous duty cycle
$f_i$ = instantaneous modulating frequency
$t_p$ = pulse width in time The pulsed electron beam current and spot scanning velocity are constant and linearity correction is therefore unnecessary.

A test was conducted on a P—31 phosphor to show that the luminance obtained from a trace was independent of the CRT spot packing density when the duty cycle is constant (the latter is achieved by using a square wave gating or blanking signal). A horizontal time base of 1 ms/cm was used and the CRT beam blanking rate was varied from $10^4$ Mb/s to $10^6$ Mb/s. The CRT spot density varied from 10 dots/cm to 1,000 dots/cm. No measurable change in luminance occurred for the 100/1 change in modulating frequency. However, the light emitted by the phosphor was found experimentally to be directly proportional to the number of constant amplitude, constant duration, variable duty cycle pulses modulating the CRT electron beam.

Figure 3:
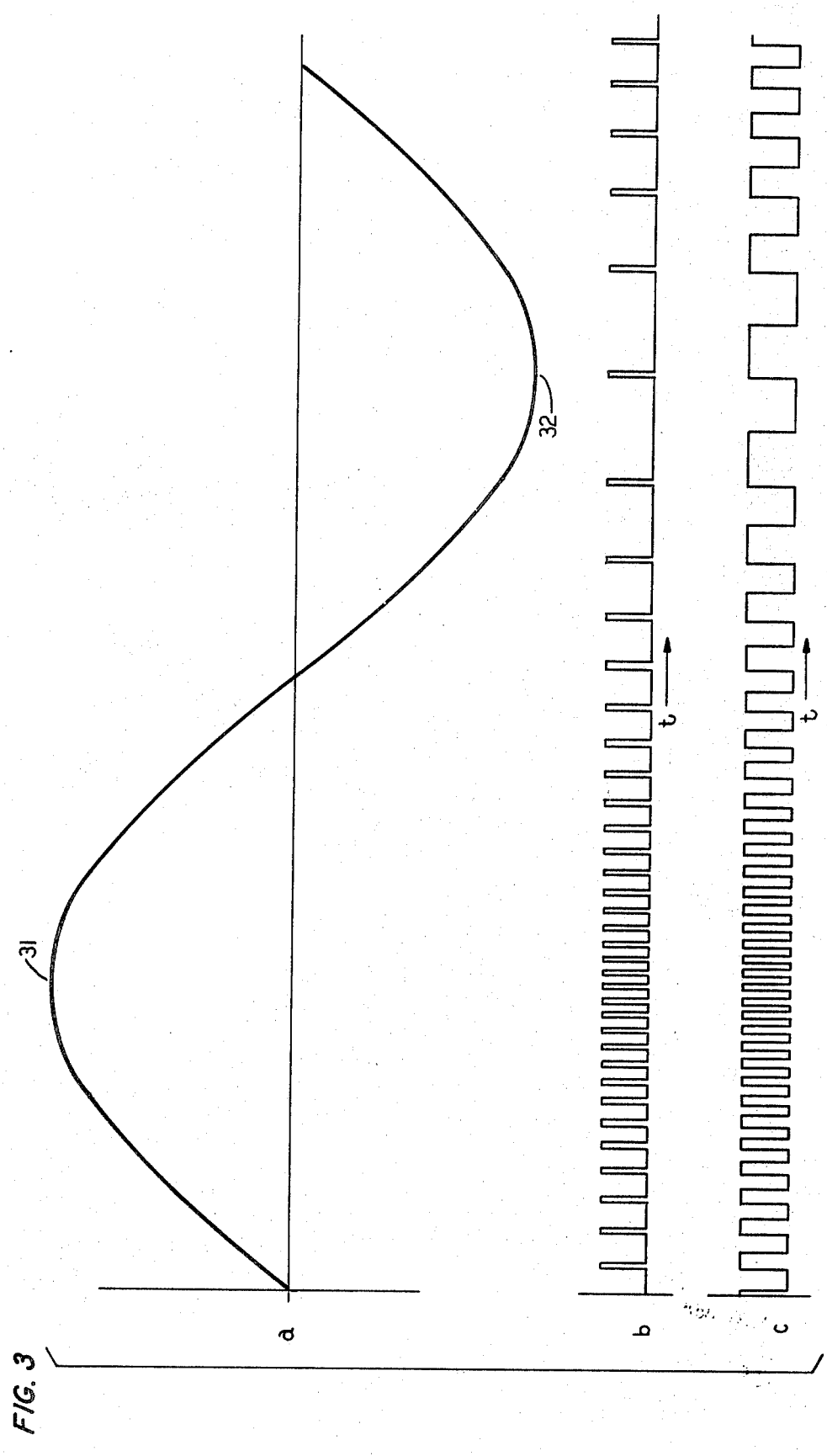
FIG. 3 shows certain waveforms useful in the explanation of the invention.

An explanation of the apparatus of FIG. 2 and its operation is perhaps best served by starting at the CRT grid and working backwards. The CRT 13 itself is of conventional design. A monopulser 27 is used to generate a pulse of fixed amplitude and duration which is used to gate (i.e., turn on) the CRT electron beam. The duration of this gating pulse is much smaller than the desired spatial period of the waveform to be displayed. The monopulser is triggered by the square wave generator 28 at a rate determined by the latter. A typical monopulser output is illustrated by the waveform $b$ of FIG. 3, and the square wave generator triggering signals are illustrated by waveform $c$ of FIG. 3. As shown in FIG. 3, the monopulser output pulses are coincident with he leading edges of the square wave triggering signals of FIG. 3c; that is, the leading edge of each square wave initiates an output pulse from the monopulser 27. The rate of the square wave generator 28 is voltage controlled by an analog signal available from the function generator 29. This analog signal may be either a sine, square, ramp, or triangular wave, or even some processed signal such as an exponential. The spatial waveform 12 observed on the CRT 13 will be that of the analog signal from function generator 29; and the spatial frequency observed is thus determined by the frequency of this analog signal, as well as by the sweep speed of the linearly scanned electron beam which is typically held constant.

Considering FIG. 3 in greater detail, the waveform $a$ represents a typical sine wave analog signal derived from function generator 29. When this analog signal is applied to the voltage controlled generator 28, square wave signals are produced having a periodicity or rate which varies sinusoidal as shown in FIG. 3c. The latter, in turn, trigger the monopulser 27 to produce fixed amplitude, fixed duration pulses whose duty cycle varies sinusoidally, as illustrated in FIG. 3b. When the sine wave analog signal is of maximum amplitude, (i.e., in and about point 31) the monopulser duty cycle is quite high, and the pulses of FIG. 3b are close together. When the analog signal is of minimum amplitude (i.e., in and about point 32) the monopulser duty cycle is quite low and the pulses thereof are widely separated, as shown in FIG. 3b. Between these two extremes, the aforementioned duty cycle and pulse spacing vary sinusoidally.

A monopulser pulse pattern such as shown in FIG. 3b produces a one-dimensional spatial waveform display that varies sinusoidally in luminosity. And the intensity of this luminous display is quite linearly related to the electrical analog signal. When the duty cycle of the monopulser output is high the CRT trace is quite intense, whereas when the duty cycle is low the luminosity of the CRT trace is low. Between these extremes the trace luminosity varies sinusoidally in accordance with the analog control signal from function generator 29. Typically, the function generator will produce a multiple of sine wave signals for each horizontal sweep or traced produced by the sweep generator 14. Thus, the one-dimensional spatial waveform display will comprise a plurality of spatial sine waves wherein each of the latter varies sinusoidally in luminosity in accordance with the modulating analog signal.

The term "one-dimensional" is intended to include any spatial distribution of light intensity so long as the intensity varies in one spatial dimensional. In practice, for example, it perhaps is desirable to vertically spot wobble the CRT electron beam so as to provide several horizontal lines or traces which vary correspondingly in intensity in one spatial dimension, i.e., horizontally. This affords greater system sensitivity. Alternately, the CRT may be designed to provide a more or less rectangular aperture for the electron beam.

The output analog signal from the function generator 29 is typically, and preferably, adjustable in frequency, be it a sine, square, ramp, or triangular wave. However, for any given setting, the output analog signal is of constant frequency until altered as by changing a potentiometer setting, for example. Depending upon the analog signal wave configuration selected the oscilloscope 25 will display a corresponding pattern such as shown in FIG. 4. This will be more evident hereinafter. Because the output signal from generator 29 is constant in frequency until altered, as described, the placing of the double-pole, double-throw switch 20 in switch position 1 provides a constant frequency spatial wave mode of operation. With the switch 20 set to switch position 2, a frequency modulated spatial wave mode of operation is available. The desirability of providing, in certain instances, a linearly varying spatial frequency display will be readily appreciated by those in the art.

Figure 5A:
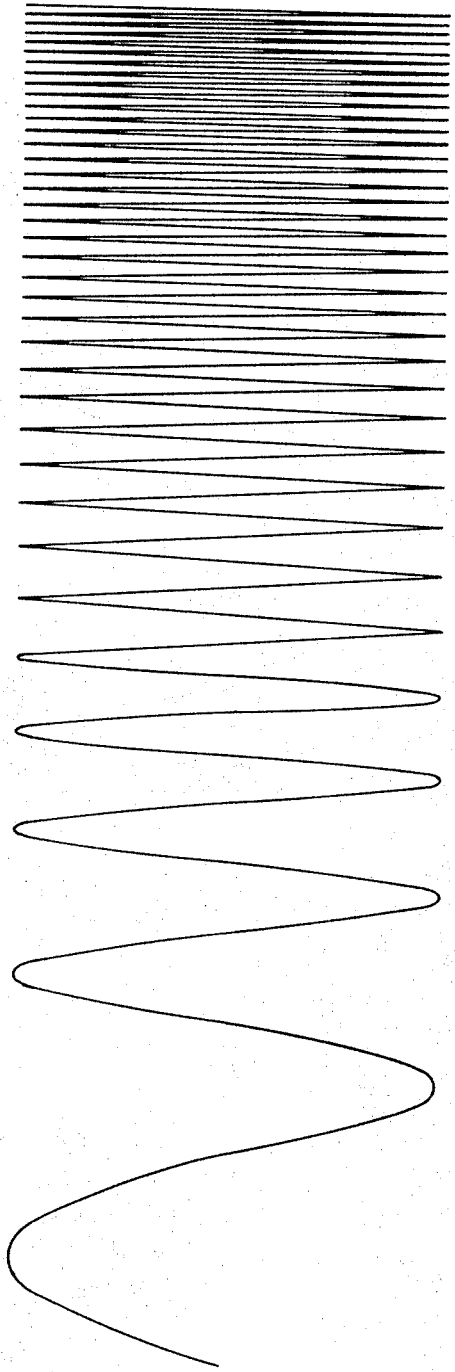
FIGS. 5a, b show additional waveforms useful in understanding the present invention.
Figure 5B:

A linearly varying spatial frequency display can be obtained by frequency modulating the analog signal of function generator 33 with a ramp or sawtooth voltage derived from the function generator 34. The frequency variation of the voltage controlled analog function generator 33 is determined by the amplitude of the modulating ramp or sawtooth wave. And the frequency of the ramp or sawtooth generator 34 determines, of course, the rate at which the frequency band will be swept. If the voltage controlled function generator 33 is designed to produce sine wave signals and a ramp or sawtooth modulating signal is delivered thereto from function generator 34, the sine wave output of generator 33 will be frequency modulated in a linear fashion such as shown in FIG. 5a. Each sine wave of the latter figure, in turn, varies the rate of the square wave generator 28 in the manner illustrated in FIG. 3. The end result is a spatial waveform display such as shown in FIG. 5b. FIG. 5b symbolically illustrates a sinusoidal spatial waveform that is frequency modulated in a linear manner; such a waveform is particularly advantageous for making spatial frequency response measurements of optical systems. The varying width of the waveform of FIG. 5b is intended to denote the varying luminosity of the one-dimensional sinusoidal spatial waveform displayed by the CRT.

As with function generator 29, the analog signal produced by function generator 33 may be either a sine, square, ramp, or triangular wave. For a linear frequency modulation of the same, the function generator 34 delivers a ramp or sawtooth signal to generator 33. However, if the generator 34 is designed to provide a sine or triangular wave modulating signal, the output wave of generator 33 will be frequency modulated in a sinusoidal fashion or in a triangular manner, as the case may be. Function generators of the type described herein are well known in the art; see, for example, the articles "Wideband F.M. Generation" by K. K. Clark and D. T. Hess, *IEEE Journal of Solid State Circuits*, March 1968, pp. 30–31, and "Accurate Triangle-Sine Converter" by G. Klein, *1967 Digest of Technical Papers, 1967 International Solid-State Circuits Conference*, pp. 120–121. In a test set-up in accordance with the invention, a WAVETEK General Purpose Voltage Controlled Generator, Model No. 112, was utilized for each of the generators 28, 29, 33 and 34 of FIG. 2. This equipment is quite versatile in that it provides a number of different output waveforms (e.g., sine, square, triangular waves), with selector switches for selecting the one desired.

Equations relating blanking rate and monopulser duty cycle to modulation percentage, modulation depth and loss introduced by the modulation process are given below.

$$\text{Mod. percent} = \frac{I_{max} - I_{min}}{I_{max} + I_{min}} \times 100 = \frac{1 - \frac{F_L}{F_H}}{1 + \frac{F_L}{F_H}} \times 100\%$$

$$\text{Mod. Depth} = 10 \log_{10} \frac{I_{max}}{I_{min}} = 10 \log_{10} \frac{F_H}{F_L} \text{ db}$$

$$\text{Light Loss} = 10 \log_{10} \frac{I_{max}}{I_{um}} = 10 \log_{10} \frac{t_1}{T_H} \text{ db}$$

Where
$I_{max}$ = Maximum Modulated Light Intensity
$I_{min}$ = Minimum Modulated Light Intensity
$I_{um}$ = Unmodulated Light Intensity
$F_L$ = Minimum Blanking Rate
$F_H$ = Maximum Blanking Rate
$t_1/T_H$ = Monopulser Duty Cycle for Maximum Blanking Rate The frequency deviation of the square wave voltage controlled oscillator is:

$$f_{PK} = K E_{PK}$$

where
$K$ = modulation sensitivity constant cycles/volts
$E_{PK}$ = peak analog modulating signal volts
The ratio of the peak upper and lower frequencies in terms of the center frequency $f_0$ and peak deviation is:

$$\frac{F_L}{F_H} = \frac{\frac{f_0}{\Delta f} - 1}{\frac{f_0}{\Delta f} + 1}$$

As noted in the Brown article supra, some sort of scanning technique is typically employed such that incremental measurements may be made across the target surface. Scanning techniques have been used in which either the target, the optical system itself, or the detector or pickup device has been placed in motion. Other scanning techniques involve the use of microdensitometers or similar devices which are scanned across photographic records of the optical system's response. In the Brown article, this scanning is achieved by the addition of a third deflection signal to the normal horizontal deflection signal applied to the camera. The target itself is held stationary. The effect of this third or raster deflection signal is to displace the camera tube's raster which is analogous to moving the target across the camera's field of view. This technique of Brown, one of the present joint-inventors, can be readily utilized herein. In the arrangement of FIG. 1, the spatial waveform 12 is held stationary (i.e., no slow displacement of drift) in the manner to be described; a raster deflection signal is then added to the normal horizontal deflection signal applied to camera 17 and it is also delivered to the horizontal input terminal of the oscilloscope 25. The spatial waveform seen by the photo-detector apparatus will thus drift slowly with respect thereto and incremental measurements will therefore be made across the entire observed one-dimensional spatial waveform displayed on CRT 21. This drift of the spatial waveform occurs cyclically and repetitively.

In accordance with the preceding technique, the ramp or sawtooth signal of sweep generator 14 is phase-locked to the output signal of function generator 29 or 34, as the case may be, so as to achieve a stationary spatial display on the CRT 13. The output from either of the latter generators is applied to sweep generator 14 via switch 20, the $n$ circuitry 35 and the break contact 36 of a relay (not shown). The break contact 36 and make contacts 37 are symbolic of the two techniques or modes wherein the required spatial waveform scan is achieved, the first of which has been briefly set-forth above with the other to be described in detail hereinafter. Since it is usually desirable to display a plurality ($n$) of waves in the one-dimensional spatial waveform display, the sawtooth sweep signal must be at a correspondingly lower repetition rate. For example, to display 25 sine waves from function generator 29, the sawtooth sweep generator 14 should operate at a rate that is one-twenty-fifth the rate of generator 29. Thus the $n$ circuitry 35 is designed to divide by 25 ($n=25$) for this case. To match the versatility of the inventive circuitry heretofore described, the $n$ circuitry 35 should comprise a plurality of switched divider circuits offering division ratios from 1 to 30, for example. A selector switch associated with the $n$ circuit will thus permit the user to select the division ratio required.

While a square wave signal from either generator 29 or 34 can be divided directly, other output signals from the same may require shaping circuitry which typically is incorporated in the $n$ circuit 35 at a point preceding the divider circuit(s). For example, for a sine wave signal from generator 29, a conventional zero-crossing detector should precede the divide operation. A great variety of shaping circuits, for all sorts of input signal waveforms, are known in the art and the invention is in no way restricted to any particular prior art shaping circuit. And, here again, to match the versatility offered by the present invention, several shaping circuits should perhaps be available, any one of which can be manually switched into the $\div n/n$ circuit depending upon the selected wave configuration from function generator 29 or 34. After shaping, if required, and the appropriate division, the $n$ circuit 35 delivers a pulse signal to sweep generator 14 to initiate a sweep therein. This sweep is thus phase-locked to the output of function generator 29 or 34 and the spatial waveform displayed on the CRT 13 is therefore stationary.

In a preferred alternative arrangement for achieving the relative scanning heretofore described, the sweep generator 14 is not synchronized but is free-running at a frequency such as to cause a slow displacement or drift of the spatial waveform 12 on the CRT display. To this end, the break contact 36 is opened and the make contacts 37 closed by actuation of a relay (not shown). Now if the function generator 29, for example, is operating at a rate or frequency of $f$ (e.g., 25 kHz) and $n$ waves (e.g., 25) are to be displayed on the CRT, then the sweep generator 14 should operate at a rate or frequency of $(f/n) \pm \Delta$, where $\Delta$ is of the order of 10 cycles per second or less. This offset frequency ($\Delta$) has the effect of causing the spatial waveform 12 to appear to drift slowly across the CRT display 13. The CRT display 21 drifts in a corresponding manner and incremental measurements are thus made across the entire one-dimensional spatial grating displayed on CRT 21. The output signals of the $n$ circuit 35 and sweep generator 14 are phase compared in the comparator 38 and a pulse is generated by the latter for every $\Delta$ cycles of phase difference between the input signals thereto. This pulse is used to trigger the sawtooth generator 39 and the latter thence delivers a sawtooth signal to the horizontal input terminal of oscilloscope 25 for the purpose of obtaining a stationary display.

Now whether the desired relative scanning is achieved by means of a stationary (CRT) spatial waveform and a camera raster deflection, as suggested in the Brown article, or by the preferred technique of operating the sweep generator 14 at a non-synchronized offset frequency, the end result is the same, i.e., the one-dimensional spatial waveform displayed on CRT 21 is caused to drift slowly with respect to the slit in mask 23. The photo-detector 24 observes the instantaneous light intensity passed by the slit in each field or frame and it converts the same to an electrical analog signal sample, which is delivered to the oscilloscope 25.

Figure 4A:
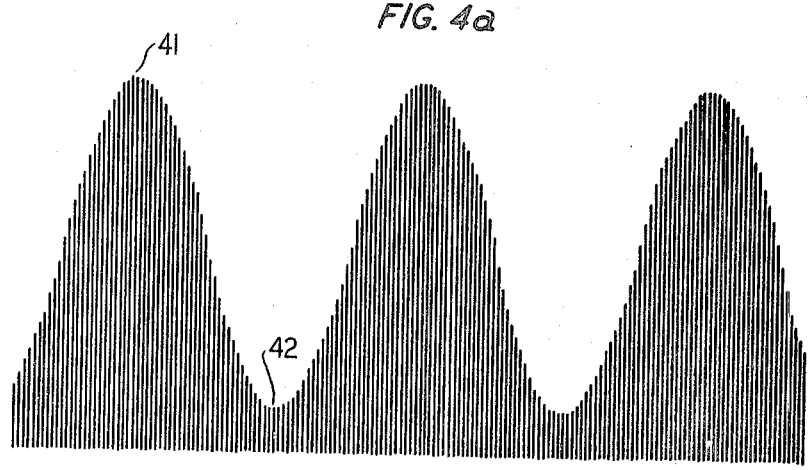
FIGS. 4a, b, c illustrate typical waveform patterns that might be observed on the cathode ray oscilloscope display screen.
Figure 4B:
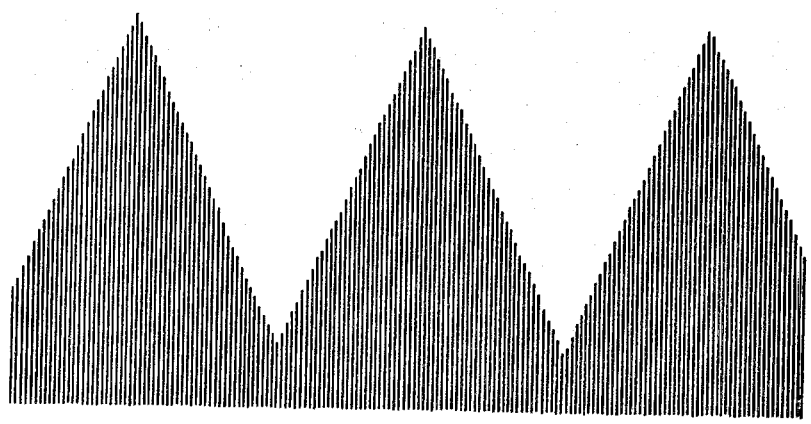
Figure 4C:
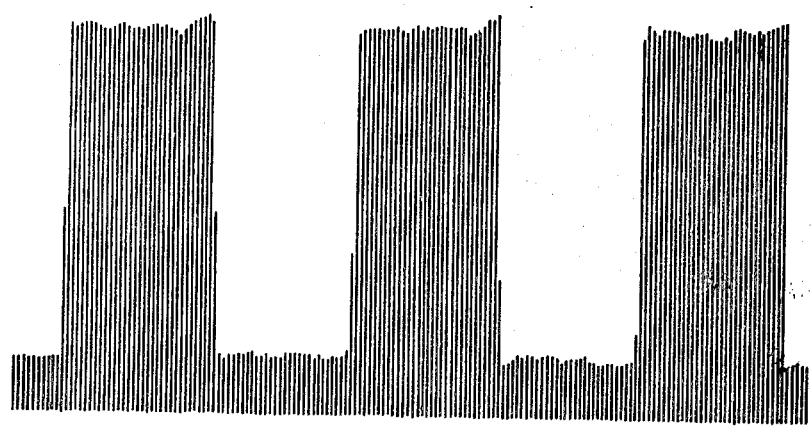

Portions of typical waveform patterns that may be observed on the oscilloscope are shown in FIG. 4. The three illustrated waveforms are representative of sinusoidal, triangular and square wave spatial gratings of fixed modulating frequency. Time runs from right to left. Each spike or sample occurs at the field or frame rate of the television system under test. The peak to peak measure (i.e., point 41 to 42) of the waveform of FIG. 4a provides an indication of the television system's spatial frequency response at the modulating frequency. This modulating frequency can then be increased in steps and a similar measure made at each step to arrive at the overall spatial frequency response of the system under test. As the modulating frequency is increased to higher and higher values, the displayed maximum peak will asymptotically approach a base line level. Alternatively, the linearly modulated sinusoidal spatial grating of FIG. 5b will result in an oscilloscope display wherein the envelope of the spikes or samples is a frequency modulated sinusoid, which is distorted by the response characteristics (e.g., frequency dependent loss) of the system under test. The triangular waveform of FIG. 4b provides an indication of the linearity response of the system under test and the square waves of FIG. 4c indicate the system's transient response.

Figure 6:
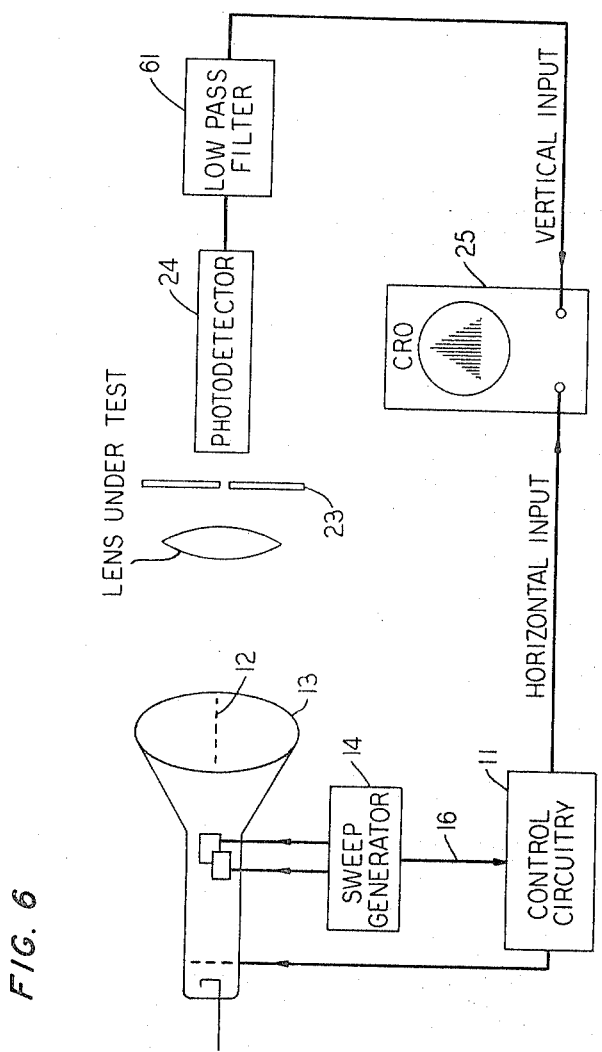
FIG. 6 is a schematic block diagram of the apparatus arrangement utilized when making measurements of the spatial response characteristics of a lens or lens system.

FIG. 6 shows a test setup for measuring the spatial response characteristics of a lens or lens system. The one-dimensional spatial grating is developed on the display screen of the CRT 13 in the same manner as previously described. The sweep generator 14 operates at a non-synchronized offset frequency, as heretofore explained, so as to cause a slow displacement or drift of the displayed waveform 12 with respect to the slit in mask 23. The photo-detector 24 observes the instantaneous light intensity passed by the slit for each horizontal scan of the CRT electron beam and it converts the same to an electrical analog signal sample, which is delivered to the oscilloscope 25. In the present case, the CRT electron beam does not scan a complete raster, but rather one or just several horizontal scans or lines are developed. Accordingly, the analog signal samples will occur at a rather high repetition rate. The low pass filter 61 serves to eliminate these spikes or samples, passing only the envelope of the same to the oscilloscope. The lens or lens system under test can be examined with regard to spatial frequency response, linearity, etc., in much the same manner as the television system described above.

Although the measuring technique has been described in terms of light input to light output, the electrical response, of a television system for example, to the input spatial signal may be measured anywhere between the input and output using standard techniques. For example, as noted in the Brown article supra, a probe can be connected to the vertical input terminal of the oscilloscope and the electrical response of a television system may then be measured at any intermediate point in the same — e.g., at the output of the television camera preamplifier.

Particular spectral responses (i.e., selected color response) can be obtained by using selected CRT phosphors and appropriate color filters. Accordingly, it is to be understood that the above-described arrangements are merely illustrative of the principles of the present invention. And other arrangements may be devised by those skilled in the art without departing from the spirit and scope of the invention.

What is claimed is:

1. Apparatus for measuring the spatial response characteristics of an optical system comprising a cathode ray tube, means for electrically generating on the display screen of said cathode ray tube a predetermined spatial waveform whose intensity varies in one-dimension and is linearly related to the signal electrically generating the same, said generating means including means for varying the periodicity of said spatial waveform, a mask having a small aperture, the optical system under test being disposed between said mask and cathode ray tube and serving to relay an image of a segment of said spatial waveform to the aperture in said mask, a photo-detector disposed behind said mask, means coupled to the output of said photo-detector for providing for the measurement of the light intensity detected by said photo-detector, and means for causing a slow scan of the spatial waveform image with respect to said aperture.

2. Apparatus for measuring the spatial response characteristics of an optical system comprising a cathode ray tube, means for electrically generating a one-dimensional spatial waveform on the display screen of said cathode ray tube with the luminosity of said cathode ray display bearing a linear proportional relationship to the signal electrically generating the same, said generating means including means for varying the periodicity of said spatial waveform, an opaque mask having a small aperture therein, the optical system under test being disposed between said mask and cathode ray tube and serving to image a small segment of the spatial waveform display upon said aperture, a photo-detector disposed behind said opaque mask, means coupled to the output of said photo-detector for providing for the measurement of the spatial response of the optical system under test, and means for causing a slow drift of the one-dimensional spatial waveform relative to said aperture.

3. Apparatus as defined in claim 2 wherein said electrical generating means serves to generate a one-dimensional sinusoidal spatial waveform of $n$ sine waves.

4. Apparatus as defined in claim 3 wherein said sinusoidal spatial waveform is frequency modulated.

5. Apparatus as defined in claim 2 wherein said electrical generating means serves to generate a spatial waveform comprising $n$ triangular spatial waves.

6. Apparatus as defined in claim 2 wherein said electrical generating means serves to generate a spatial waveform comprising $n$ spatial square waves.

7. Apparatus for measuring the spatial response of optical systems comprising a cathode ray tube, means for linearly scanning the electron beam of said cathode ray tube in one given direction, means for gating the linearly scanned electron beam with constant amplitude, constant duration, variable duty cycle pulses so as to generate on the display screen of said cathode ray tube a predetermined one-dimensional spatial waveform whose luminosity is linearly related to the duty cycle of the gating pulses, means for varying the duty cycle of the gating pulses in a selected manner, an opaque mask having a narrow slit therein, the optical system under test being disposed between said mask and the cathode ray tube and serving to relay an image of a small segment of the spatial waveform display to said slit, a photo-detector disposed behind said opaque mask, means coupled to the output of said photo-detector for providing for the measurement of the light intensity detected by said photo-detector, and means for causing a slow drift of the one-dimensional spatial waveform relative to the slit in said mask.

8. Apparatus as defined in claim 7 wherein the duty cycle of said gating pulses is varied sinusoidally so as to generate a one-dimensional sinusoidal spatial waveform of $n$ spatial sine waves.

9. Apparatus as defined in claim 8 wherein the sinusoidal variation of said duty cycle is carried out at a linearly varying rate so as to provide a linearly varying sinusoidal spatial waveform display.

10. Apparatus as defined in claim 7 wherein the duty cycle of the gating pulses is varied in a manner such as to achieve a spatial waveform display of $n$ triangular spatial waves.

11. Apparatus as defined in claim 7 wherein the duty cycle of the gating pulses is varied in a manner such as to achieve a spatial waveform display of $n$ spatial square waves.

12. Apparatus as defined in claim 7 wherein the electron beam scanning means is operated at a non-synchronous offset frequency with respect to a sub-multiple of the operating frequency of the duty cycle varying means so as to effect a slow drift in the spatial waveform display.

13. Apparatus for measuring the spatial frequency response of an optical system comprising a cathode ray tube, means for linearly scanning the electron beam of said cathode ray tube in one given direction, means for gating the linearly scanned electron beam with constant amplitude, constant duration, variable duty cycle pulses so as to generate on the display screen of said cathode ray tube a one-dimensional spatial waveform whose luminosity is linearly related to the duty cycle of the gating pulses, means for sinusoidally varying the duty cycle of said gating pulses, an opaque mask having a narrow slit therein, the optical system under test being disposed between said mask and the cathode ray tube and serving to relay an image of a finite segment of the spatial waveform display to said slit, a photo-detector disposed behind said opaque mask, oscilloscope means connected to the output of said photo-detector for providing a visual indication of the instantaneous light intensity detected by said photo-detector, and means for causing a slow drift in the one-dimensional sinusoidal spatial waveform displayed on said display screen.

14. Apparatus as defined in claim 13 wherein the sinusoidal variation of said duty cycle is carried out in a linear frequency modulated fashion so as to provide a linear frequency modulated sinusoidal spatial waveform display.

15. A spatial waveform display for use in making spatial response measurements off optical systems comprising a cathode ray tube, means for linearly scanning the electron beam of said cathode ray tube in one given direction, means for gating the linearly scanned electron beam with constant amplitude, constant duration, variable duty cycle pulses so as to generate on the display screen of said cathode ray tube a predetermined one-dimensional spatial waveform whose luminosity is linearly related to the duty cycle of the gating pulses, means for varying the duty cycle of the gating pulses in a selected manner, and means for causing a slow drift in the spatial waveform generated on the display screen of said cathode ray tube.

16. Apparatus as defined in claim 15 wherein the duty cycle of said gating pulses is varied sinusoidally so as to generate a one-dimensional sinusoidal spatial waveform of $n$ spatial sine waves on said display screen.

17. Apparatus as defined in claim 16 including means for linearly varying the frequency of the sinusoidal variations of said duty cycle so as to provide a linearly varying sinusoidal spatial waveform display.

18. Apparatus as defined in claim 15 wherein the duty cycle of the gating pulses is varied in a manner such as to achieve a spatial waveform display of $n$ triangular spatial waves.

19. Apparatus as defined in claim 15 wherein the duty cycle of the gating pulses is varied in a manner such as to achieve a spatial waveform display of $n$ spatial square waves.

20. Apparatus as defined in claim 15 wherein the electron beam scanning means is operated at a non-synchronous frequency which is offset with respect to a sub-multiple of the operating frequency of the duty cycle varying means so as to effect the slow drift in the spatial waveform display.

* * * * *